(12) United States Patent
Rrumbullaku et al.

(10) Patent No.: US 11,325,563 B2
(45) Date of Patent: May 10, 2022

(54) APPROACH-BASED VEHICLE SYSTEM ACTUATION

(71) Applicant: GM GLOBAL TECHNOLOGY OPERATIONS LLC, Detroit, MI (US)

(72) Inventors: Besi Rrumbullaku, Rochester, MI (US); Thiago Laserra Lima, Royal Oak, MI (US); Vincent C. Rovis, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/986,651

(22) Filed: Aug. 6, 2020

(65) Prior Publication Data

US 2022/0041133 A1  Feb. 10, 2022

(51) Int. Cl.
| | |
|---|---|
| *B60W 30/095* | (2012.01) |
| *B60R 25/24* | (2013.01) |
| *B60R 25/20* | (2013.01) |
| *B60R 25/31* | (2013.01) |
| *H04W 4/02* | (2018.01) |

(52) U.S. Cl.
CPC ........ *B60R 25/241* (2013.01); *B60R 25/2018* (2013.01); *B60R 25/245* (2013.01); *B60R 25/31* (2013.01); *B60W 30/095* (2013.01); *H04W 4/02* (2013.01)

(58) Field of Classification Search
CPC ........ G06Q 20/321; G07C 2009/00507; G07C 9/00309; G07C 9/00174; G07C 2009/00793; G07C 2209/63; G07C 2009/00333; G07C 2009/00547; H04W 12/065; H04W 4/029; H04W 12/06; H04W 4/021; H04W 4/023; H04W 4/40; E05F 2015/483; E05F 5/06; E05F 15/40; E05F 2015/434; E05F 2015/767; E05Y 2900/531; E05Y 2400/40; B60R 2025/1013; B60R 2325/101; B60R 2325/108; B60R 2325/205; B60R 2325/306; B60R 25/045; B60R 25/104; B60R 25/209; B60R 25/22; B60R 25/24; B60R 25/245; B60R 2325/207; B60R 25/33; G01S 19/16; G06V 20/58
See application file for complete search history.

(56) References Cited

U.S. PATENT DOCUMENTS

| | | | |
|---|---|---|---|
| 2019/0024430 A1* | 1/2019 | Jeromin | G06K 9/00805 |
| 2019/0286806 A1* | 9/2019 | Robinson | H04W 12/64 |
| 2020/0086829 A1* | 3/2020 | Wall | H04W 4/023 |
| 2020/0223397 A1* | 7/2020 | Sakai | G06K 9/00791 |
| 2021/0229627 A1* | 7/2021 | Salter | B60R 25/245 |

* cited by examiner

*Primary Examiner* — Dionne Pendleton
(74) *Attorney, Agent, or Firm* — Cantor Colburn LLP

(57) ABSTRACT

A system and method for actuating a vehicle system tracks approach to the vehicle and determines propriety of system actuation based upon trajectory information and other conditions.

14 Claims, 2 Drawing Sheets

APPROACH-BASED VEHICLE SYSTEM ACTUATION

INTRODUCTION

This disclosure is related to automated actuation. More particularly, the disclosure is related to automated actuation of vehicle systems.

SUMMARY

In one exemplary embodiment, an apparatus for vehicle system actuation includes external object tracking system for tracking an object and providing tracked object trajectory information, a vehicle system and actuator thereof, and a controller. The controller may be configured to determine trajectory information of the tracked object, validate the tracked object, and command the vehicle system actuator based upon validation of the tracked object and a determination that the tracked object will not conflict with an actuated vehicle system based upon the tracked object trajectory information.

In addition to one or more of the features described herein, the controller may command the vehicle system actuator when the tracked object trajectory information comprises a predetermined acceptable range of the tracked object.

In addition to one or more of the features described herein, the controller may command the vehicle system actuator when the tracked object trajectory information comprises a predetermined acceptable position and vector of the tracked object.

In addition to one or more of the features described herein, the external object tracking system may include at least one of a radar system, a lidar system, a passive radio frequency entry system, an ultrasonic system, and a vision system.

In addition to one or more of the features described herein, the apparatus may further include a passive radio frequency entry system, wherein the external object tracking system comprises a radar system, and wherein the controller configured to validate the tracked object comprises the passive radio frequency entry system configured to authenticate an electronic security token.

In addition to one or more of the features described herein, the apparatus may further include a passive radio frequency entry system, wherein the controller configured to validate the tracked object may include the passive radio frequency entry system configured to authenticate an electronic security token.

In addition to one or more of the features described herein, the controller configured to validate the tracked object may include the controller configured to classify the tracked object as a person and to authenticate an electronic security token.

In addition to one or more of the features described herein, the electronic security token may include one of a key fob, a mobile phone, and an access card.

In addition to one or more of the features described herein, the external object tracking system may include a passive RF entry system.

In addition to one or more of the features described herein, trajectory information of the tracked object may be detected based upon at least one of RF signal strength, RF signal phase, and RF signal time of flight.

In addition to one or more of the features described herein, the vehicle system actuator may include at least one of a door lock actuator, a door latch actuator and a door actuator.

In another exemplary embodiment, a method for vehicle system actuation may include tracking an object external to the vehicle with an external object tracking system, determining trajectory information of the tracked object, validating the tracked object, and commanding the vehicle system actuation based upon validation of the tracked object and a determination that the tracked object will not conflict with an actuated vehicle system based upon the tracked object trajectory information.

In addition to one or more of the features described herein, the vehicle system actuation may be commanded when the tracked object trajectory information comprises a predetermined acceptable range of the tracked object.

In addition to one or more of the features described herein, the vehicle system actuation may be commanded when the tracked object trajectory information comprises a predetermined acceptable position and vector of the tracked object.

In addition to one or more of the features described herein, validating the tracked object may include authenticating an electronic security token.

In addition to one or more of the features described herein, validating the tracked object may include classifying the tracked object as a person and authenticating an electronic security token.

In addition to one or more of the features described herein, the electronic security token may include one of a key fob, a mobile phone, and an access card.

In yet another exemplary embodiment, an apparatus for vehicle system actuation may include a radar-based external object tracking system for tracking an object and providing tracked object trajectory information, a passive RF entry system including a security token, a vehicle door actuation system, and a controller. The controller may be configured to determine a trajectory of the tracked object based upon radar signals, classify the tracked object as a person, authenticate a RF security token in proximity to the person, and control the vehicle door actuation system based upon classification of the tracked object, authentication of the RF security token, and a determination that the person will not conflict with an actuated vehicle door system based upon the tracked object trajectory information.

In addition to one or more of the features described herein, the RF security token may include one of a key fob, a mobile phone, and an access card.

In addition to one or more of the features described herein, the vehicle door actuation system may include a door lock, a door latch and a door opener.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
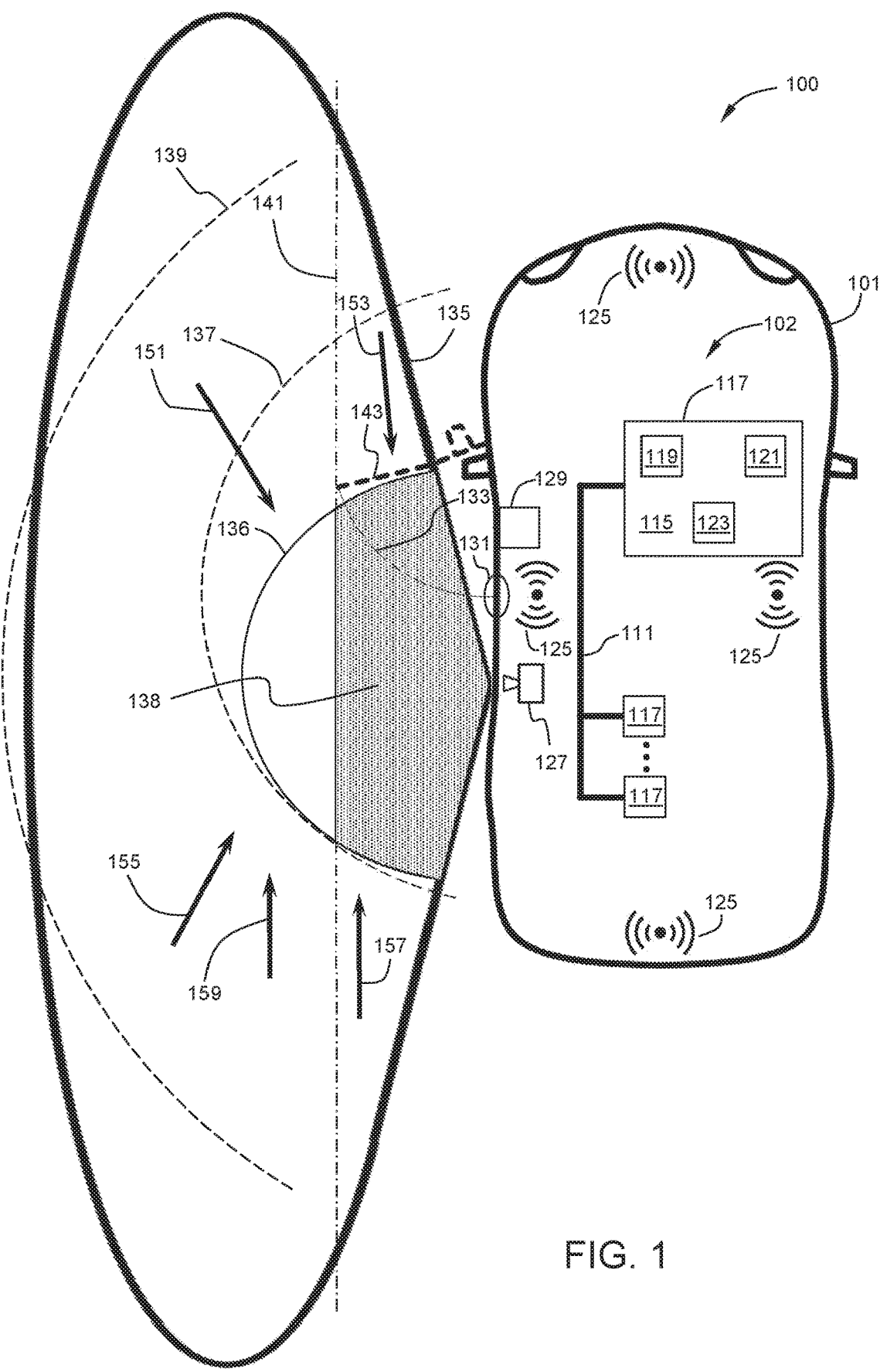
FIG. 1 illustrates an exemplary system for vehicle system actuation, in accordance with the present disclosure.

The following description is merely exemplary in nature and is not intended to limit the present disclosure, its application or uses. Throughout the drawings, corresponding reference numerals indicate like or corresponding parts and features. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service-related networks. Functions of the control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module may include a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

A vehicle may be equipped with various sensors, communication hardware and systems, control modules, systems and actuators. An exemplary vehicle 101 is shown in FIG. 1 which illustrates an exemplary apparatus 100 for approach-based vehicle system actuation, in accordance with the present disclosure. Vehicle 101 may include a control system 102 including a plurality of networked electronic control units (ECUs) 117 which may be communicatively coupled via a bus structure 111 to perform control functions and information sharing, including executing control routines locally or in distributed fashion. Bus structure 111 may be a part of a Controller Area Network (CAN), or other similar network, as well known to those having ordinary skill in the art. One exemplary ECU may include a body control module (BCM) 115 primarily performing functions related to electronic accessories, control and diagnostics. BCM 115 may receive or monitor a variety of inputs, for example from sensors and user interfaces, either discretely or via bus structure 111 communications. One having ordinary skill in the art recognizes that a plurality of other ECUs 117 may be part of the network of controllers onboard the vehicle 101 and may perform other functions related to various other vehicle systems (e.g. engine, chassis, steering, braking, transmission, communications, infotainment, etc.). BCM 115 may include a variety of control modules, for example a passive entry passive start (PEPS) module 119, an external object calculation (EOC) module 121, and a side access module (SAM) 123. Alternatively, any of the various modules included in BCM 115 may be implemented in other ECUs, the various functions of each module may be distributed among other ECUs or may be performed off board in a cloud computing environment, for example.

PEPS module 119 may primarily perform tasks and routines related to secure wireless communication in a PEPS system between the vehicle 101 and, for example, a key fob or other electronic security token that provides secure user access to the vehicle 101 by authenticating the security token and unlocking doors without physically employing a key. Additional control access, for example vehicle operational control, may be granted once the security token is within the vehicle cabin. Such systems use radio frequency (RF) signals for authenticating the security token. Vehicle 101 may include at least one and preferably a plurality of distributed antennas 125 for transmission and receipt of RF signals related to PEPS functions. Antennas 125 may be distributed for effective coverage 360 degrees around the vehicle, for example at four corners or quadrants of the vehicle or, as illustrated, front, back and at each side. Such antenna placements are merely exemplary and not limiting. PEPS systems may also sense security token proximity, discerning between external key fobs and in cabin key fobs, thus enabling differentiation in the types of access being granted (i.e. entry vs. operational). PEPS system may refer to either of both the PEPS module 119 and security tokens.

EOC module 121 may primarily perform functions related to sensing the environment external to the vehicle 101, for example related to roadway lane, pavement and objects (including pedestrians, vehicles and hazards) sensing as part of anti-collision or situational awareness systems. EOC module 121 may receive information from a variety of sensors and other sources. By way of example only and not of limitation, EOC module 121 may receive information from one or more radar sensors, lidar sensors, ultrasonic sensors, vision sensors, global positioning systems, vehicle-to-vehicle communication systems, and vehicle-to-infrastructure communication systems, as well as from on or off board databases; for example map and infrastructure databases. EOC module 121 may therefore have access to object position, range, and rate information. EOC module sensors may be positioned at various perimeter points around the vehicle including front, rear, corners, sides etc. One exemplary radar sensor 127 is shown at the driver side of the vehicle 101, for example rearward of the B-pillar area 131. Radar sensor 127 positioning may be selected as appropriate for providing the desired coverage for particular applications. For example, side positioning of sensor 127 may be more preferred with respect to sensing adjacent vehicles in an anti-collision system or pedestrians external to the vehicle 101 in a situational awareness system, in accordance with the present disclosure. Radar sensor 127 may be coupled directly to EOC module 121. Alternatively, radar sensor output may be provided to EOC module 121 over the bus structure 111 as well understood by those having ordinary skill in the art. While a radar sensor is exemplified and illustrated, other sensors including lidar sensors, ultrasonic sensors, and vision sensors may provide object sensing inputs to EOC module alternatively or additionally in accordance with the present disclosure. Radar system may refer to either or both the EOC module and radar sensor 127.

External object tracking system may refer to either or both the EOC module and one or more of a radar sensor, lidar sensor, ultrasonic sensor, vision sensor, or alternative object detection sensor.

Vehicle 101 may include a plurality of controllable vehicle systems and associated actuators. For example, vehicle 101 may include a door 143. Door 143 is illustrated in a front-hinged configuration; however, door 143 may be hinged in other configurations, for example in rear-hinged configuration or in roof-hinged "gull-wing" configuration. Door 143 may be operable between extreme positions— closed as illustrated in solid line and fully open as illustrated in broken line. Door 143 swings between open and closed with the free end sweeping an arc 133. The free end may include a latch which catches a striker mounted in the B-pillar area 131. Door 143 may also be hingeless and tracked, such as in a sliding bypass configuration. Door 143 may have an associated vehicle door actuation system 129 including one or more actuators, for example a lock actuator, a latch actuator, and a door opening actuator. Actuators may include rotary or linear electric motors or solenoids, hydraulics, or electric over hydraulics, by way of non-limiting examples. SAM 123 may primarily perform functions related to providing access to the vehicle 101 through door 143 by commanding one or more actuators to, for example, unlock, unlatch and/or open the door 143. While the present disclosure is illustrated by way of a front-hinged door embodiment, alternative door embodiments are envisioned, as are alternative vehicle systems and corresponding actuators, for example power trunks, decklids and hatchbacks, power fuel filler or recharge port covers, lighting, power seats, power steering columns, power mirrors, power liftgates and tailgates, ramps, lifts, alternative mobility access lifts, etc. Such examples are offered by way of non-limiting examples.

The PEPS system may include a passive RF zone 139 surrounding the vehicle 101 effective to a first distance of, for example, about 5-7 meters. Similarly, the PEPS system may include an active RF zone 137 localized about the antenna 125 closest to the B-pillar 131 on the driver side of the vehicle 101 and effective to a second distance of, for example, about 1.5-2 meters. A key fob or other security token may be recognized and authenticated while in the passive RF zone 139 and the PEPS system programmed to respond, for example, by illuminating certain vehicle lights to welcome or indicate recognition of the person carrying the security token. A key fob or other security token may be recognized and authenticated while in the active RF zone 137 and the PEPS system programmed to respond, for example, by allowing unlocking of the door 143 by a handle touch, pull, push-button or proximity. In accordance with the present disclosure, the PEPS system may offer user recognition and authentication for approach-based vehicle system actuation as further described herein.

In accordance with one exemplary embodiment, the radar system provides a relatively wide-angle beam coverage and defines a passive radar zone 135 to a distance of, for example, about 5-7 meters. The passive radar zone 135 may overlay, in whole or in part, the passive RF zone 139. Similarly, the radar system defines an active radar zone 136 to a distance of, for example, about 1.5-2 meters. The active radar zone 136 may overlay, in whole or in part, the active RF zone 137.

Figure 2:
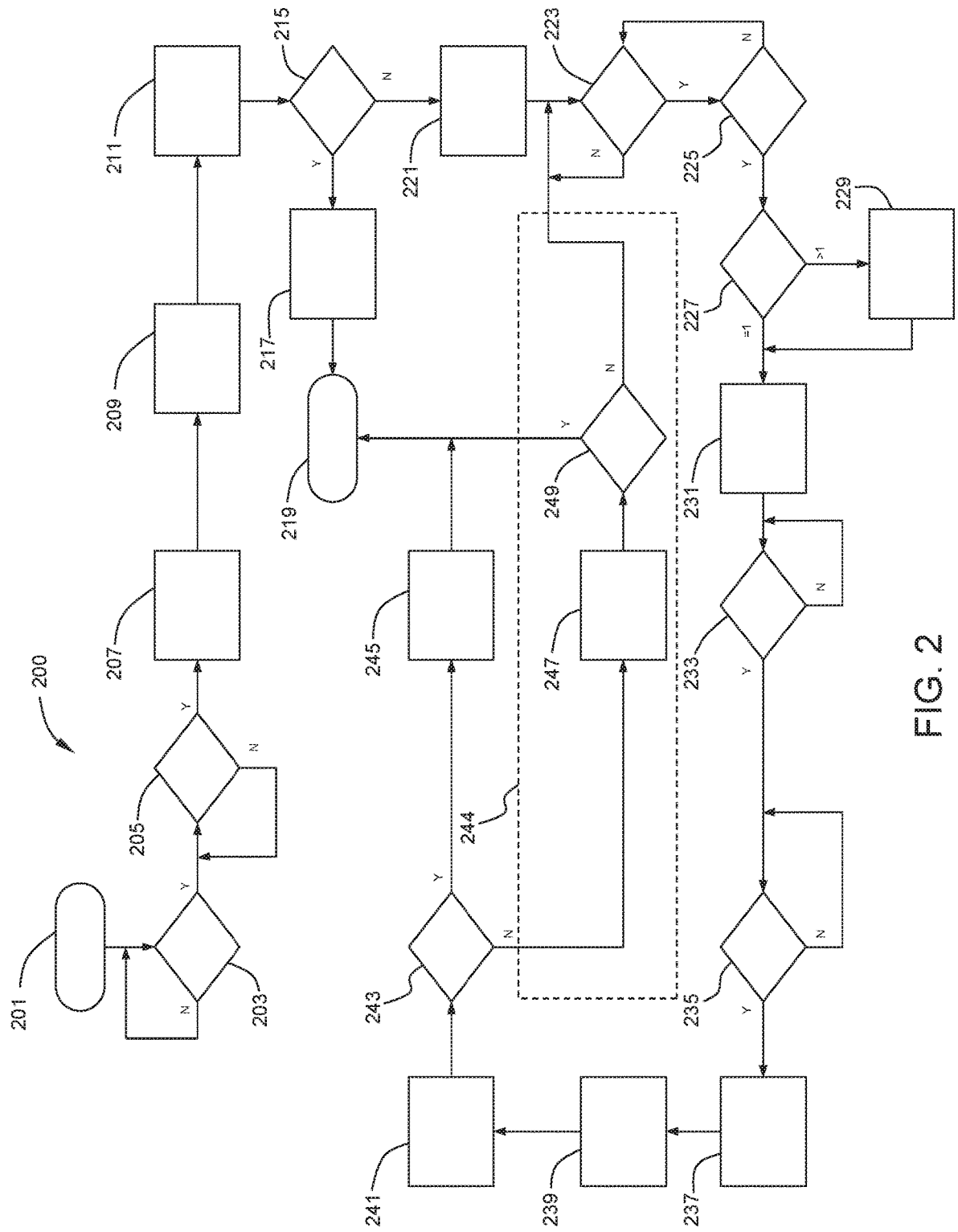
FIG. 2 illustrates an exemplary method for vehicle system actuation, in accordance with the present disclosure.

With continued reference to FIG. 1, additional reference to FIG. 2 and in accordance with one embodiment, an exemplary approach-based vehicle system actuation method and apparatus is exemplified with respect to door 143 and associated vehicle door actuation system 129. Method 200 is illustrated as a flow diagram with individual steps and groups of steps in a substantially linear routine. One skilled in the art will understand that the method described may be represented in alternative ways including state flow diagrams and activity diagrams, for example. One skilled in the art also understands that the various steps in the flow diagram of method 200 may be implemented in different orders and/or simultaneously, and consolidated or split. The method 200 may begin the routine at block (201) where the vehicle 101 is, for example, not occupied and not being operated such as after being parked, exited, locked and left in a sleep mode. While in sleep, the vehicle may have certain systems operating, for example antitheft monitoring, parasitic load monitoring and battery protection, traction battery recharging and PEPS system monitoring. At block (203), PEPS system may wait to begin a security token monitoring routine, for example a predetermined time after the security token has left the active RF zone 137. If the monitoring has not begun, block (203) loops and waits. When monitoring has begun, block (205) may monitor the passive RF zone 139 for appearance of a security token. If none is found, the PEPS system merely continues to monitor. When a security token is detected within the passive RF zone 139, however, block (205) attempts to authenticate the security token. If the security token does not authenticate, then block (205) continues to monitor. Otherwise, an authenticated security token within the passive RF zone 139 will cause the PEPS system to fully wake to a more active monitoring state and may cause additional vehicle systems to wake at block (207) including SAM 123 causing the radar system to wake at block (209). The radar system becomes active at block (211) to effect the approach-based door actuation functions and begins to radiate. Diagnostic checks are made to ensure the radar sensor 127 is operational and not occluded at block (215). If it is inoperable, SAM 123 records a fault message at block (217) and the routine is exited at block (219). Upon passing diagnostic checks at block (215), the routine continues at block (221) where the radar system monitors for objects within the passive radar zone 135. The radar system continues to monitor at block (223) and when an object is detected may proceed to block (225) where the radar system may partially validate the object by classification. If the object is not a person, the routine continues to monitor for a new object at block (223). Classification of a detected object as a person at block (225) may result in a differentiation among multiple persons at block (227). Multiple persons may cause block (229) to focus the radar system tracking on the person closest to the active radar zone 136 for example. Regardless, a single person's trajectory may be tracked at block (231). Trajectory as used herein is understood to include such information as a tracked target's dynamic vectoring, for example, a tracked object's distance or range, position (present and future predicted), and velocity including rate and direction of travel over time. If the tracked person's trajectory indicates an acceptable intersection with an active trajectory zone at block (233), then the routine continues at block (235). Otherwise, the routine continues to monitor and evaluate the trajectory at block (233).

In accordance with one embodiment, an active trajectory zone may correspond to a region primarily defined within the active radar zone 136, yet further limited in distance or range from the vehicle 101. An exemplary active trajectory zone 138 illustrated in FIG. 1 may be within the active radar zone but further limited to within a predetermined range, for example substantially 1.5 meters from the longitudinal centerline of vehicle 101, delineated as line 141 in FIG. 1. An acceptable trajectory of a tracked person may include consideration of some or all trajectory information. For example, a trajectory clearly placing the tracked person on path for intersection with the active trajectory zone 138 may nonetheless be unacceptable where the trajectory may also intersect with an open door 143 and/or the door's path of travel. However, approach direction of the trajectory may make such an intersecting trajectory acceptable, as might rate of approach. For example, a trajectory consistent with vector 153 would intersect with active trajectory zone 138 but may be unacceptable because it may conflict with the path of travel of door 143 unless the rate of approach suggests the tracked person would clear the door swing in advance of opening. On the other hand, a trajectory consistent with vectors 155 and 157 would also intersect with the active trajectory zone 138 and the path of travel of the door 143; however, such trajectories may be acceptable because they don't conflict with the path of travel of door 143 since they approach into the opening. Nonetheless, a trajectory consistent with vectors 155 and 157 may be unacceptable where the rate may suggest a conflict. It is understood that the trajectory information is dynamic and continually monitored. Therefore, as the trajectory information changes, so too may the acceptability of actuating the door in the present embodiment. An additional example of an acceptable trajectory vector 151 (which never intersects with door swing) is illustrated. Yet another example of an unacceptable trajectory vector 159 (which never intersects with the active trajectory zone 138) is also illustrated.

At block (235), the tracked person whose trajectory indicates an acceptable intersection with the active trajectory zone 138 is checked for entry into the active radar zone 136. Until entry into the active radar zone 136, block (235) continues to monitor. Upon entry, however, block (235) exits to block (237) whereat additional verification of the continued existence of the tracked person in the active radar zone 136 is performed. Block (239) next triggers a door open request to the SAM 123 which in turn requests the BCM 115 to unlatch the door 143 at block (241). Block (243) may perform additional validation by authenticating the security token and determining whether it is within the active RF zone 137. If validated, block (245) causes BCM 115 to command the door lock actuator to disengage the lock, causes SAM to command the door latch actuator to disengage the latch and the door actuator to open the door 143. Subsequent to block (245), the routine is exited at block (219). If validation fails at block (243), the routine may proceed directly to block (219) and may be exited. Alternatively, a timeout sequence (244) may be executed including setting a timer at block (247) and checking for expiration of the timer at block (249). Where the timer remains active, block (223) is accessed to begin secondary executions of target evaluations as previously described herein. Where the timer has expired, the routine may proceed to block (219) and may be exited.

The exemplary embodiment set forth above employs a radar system and PEPS system. Alternative embodiments may employ an alternative external object tracking system based on one or more of a radar sensor, a lidar sensor, ultrasonic sensor, vision sensor, or combinations thereof together with a PEPS system or alternative security token authentication. An alternate embodiment may also exclusively employ a PEPS system or similar passive radio frequency entry system. For example, one skilled in the art understands that RF entry systems may be adapted to track the trajectory of a key fob or other security token. For example, distance estimations of a security token may be determined by signal strength based estimates, signal phase based estimates or signal time-of-flight based estimates. Signal triangulation techniques are understood by on having ordinary skill in the art and may be employed with any security token distance estimations to determine position. Based upon such distance and position estimates, the EOC module 121 may readily determine additional trajectory parameters. It is therefore understood that references to tracked person in the embodiment above with respect to radar tracking may be applied to a tracked key fob or other security token in RF based tracking.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An apparatus for vehicle system actuation, comprising:
   a passive radio frequency (RF) entry system;
   an external object tracking system;
   a vehicle system and actuator thereof; and
   a controller configured to:
   detect and authenticate an electronic security token within a first RF zone;
   wake the external object tracking system to monitor a first object tracking zone upon the detection and authentication of the electronic security token;
   detect an object within the first object tracking zone, classify the detected object as a person, and determine trajectory information of the person;
   determine an acceptable trajectory of the person based upon the trajectory information;
   detect the person within a second object tracking zone closer in range to the vehicle than the first object tracking zone;
   detect and authenticate the electronic security token within a second RF zone closer in range to the vehicle than the first RF zone; and command the vehicle system actuator based upon the authentications of the security token and the acceptable trajectory of the person.

2. The apparatus of claim 1, wherein the controller commands the vehicle system actuator when the trajectory information comprises a predetermined acceptable range of the person.

3. The apparatus of claim 1, wherein the controller commands the vehicle system actuator when the trajectory information comprises a predetermined acceptable position and vector of the person.

4. The apparatus of claim 1, wherein the external object tracking system comprises at least one of a radar system, a lidar system, an ultrasonic system, and a vision system.

5. The apparatus of claim 1, wherein the electronic security token comprises one of a key fob, a mobile phone, and an access card.

6. The apparatus of claim 1, wherein the trajectory information is based upon at least one of RF signal strength, RF signal phase, and RF signal time of flight.

7. The apparatus of claim 1, wherein the vehicle system actuator comprises at least one of a door lock actuator, a door latch actuator and a door actuator.

8. A method for vehicle system actuation, comprising:
   detecting and authenticating, with a passive radio frequency (RF) entry system, an electronic security token within a first RF zone;
   waking an external object tracking system to monitor a first object tracking zone upon the detection and authentication of the electronic security token;
   detecting, with the external object tracking system, an object within the first object tracking zone;
   classifying the detected object as a person;
   determining trajectory information of the person;
   determining an acceptable trajectory of the person based upon the trajectory information;
   detecting the person within a second object tracking zone closer in range to the vehicle than the first object tracking zone;
   detecting and authenticating the electronic security token within a second RF zone closer in range to the vehicle than the first RF zone; and
   commanding the vehicle system actuation based upon the authentications of the security token and the acceptable trajectory of the person.

9. The method of claim 8, wherein the vehicle system actuation is commanded when the trajectory information comprises a predetermined acceptable range of the person.

10. The method of claim 8, wherein the vehicle system actuation is commanded when the trajectory information comprises a predetermined acceptable position and vector of the person.

11. The method of claim 8, wherein the electronic security token comprises one of a key fob, a mobile phone, and an access card.

12. An apparatus for vehicle system actuation, comprising:
   a radar-based external object tracking system;
   a passive radio frequency (RF) entry system comprising a security token;
   a vehicle door actuation system; and
   a controller configured to:
      detect and authenticate the security token within a first RF zone;
      wake the external object tracking system to monitor a first object tracking zone upon the detection and authentication of the security token;
      detect an object within the first object tracking zone, and determine trajectory information of the detected object based upon radar signals;
      classify the detected object as a person;
      determine an acceptable trajectory of the person based upon the trajectory information;
      detect the person within a second object tracking zone closer in range to the vehicle than the first object tracking zone;
      detect and authenticate the security token within a second RF zone closer in range to the vehicle than the first RF zone; and
      control the vehicle door actuation system based upon the authentications of the security token, and a determination that the person will not conflict with an actuated vehicle door system based upon the trajectory information.

13. The apparatus of claim 12, wherein the RF security token comprises one of a key fob, a mobile phone, and an access card.

14. The apparatus of claim 12, wherein the vehicle door actuation system comprises at least one of a door lock, a door latch and a door opener.

\* \* \* \* \*